Jan. 12, 1932.   F. G. GOETZ   1,840,502
ONION LIFTING APPARATUS
Filed Nov. 19, 1929   3 Sheets-Sheet 1
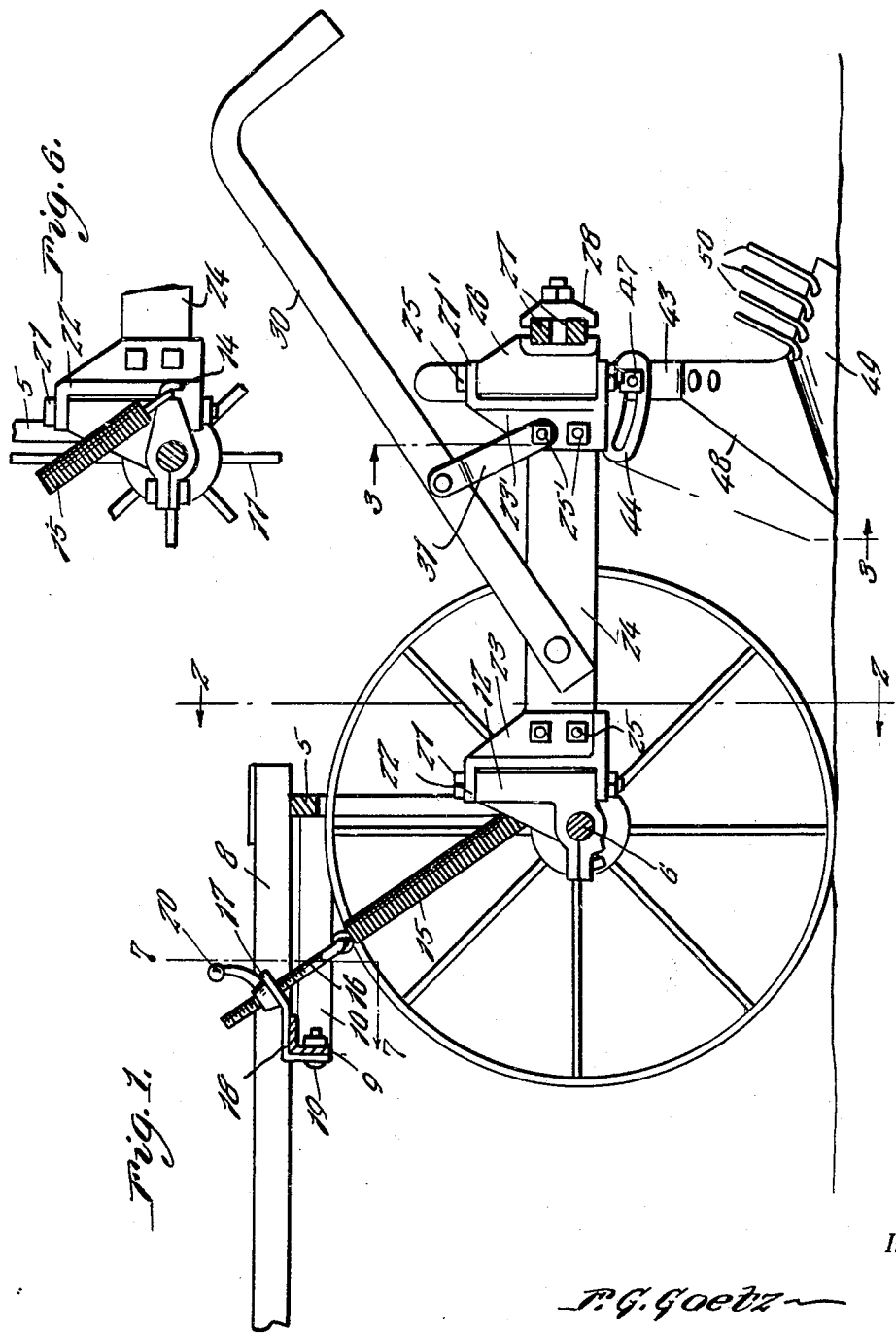
Inventor
F. G. Goetz
By Clarence A. O'Brien
Attorney

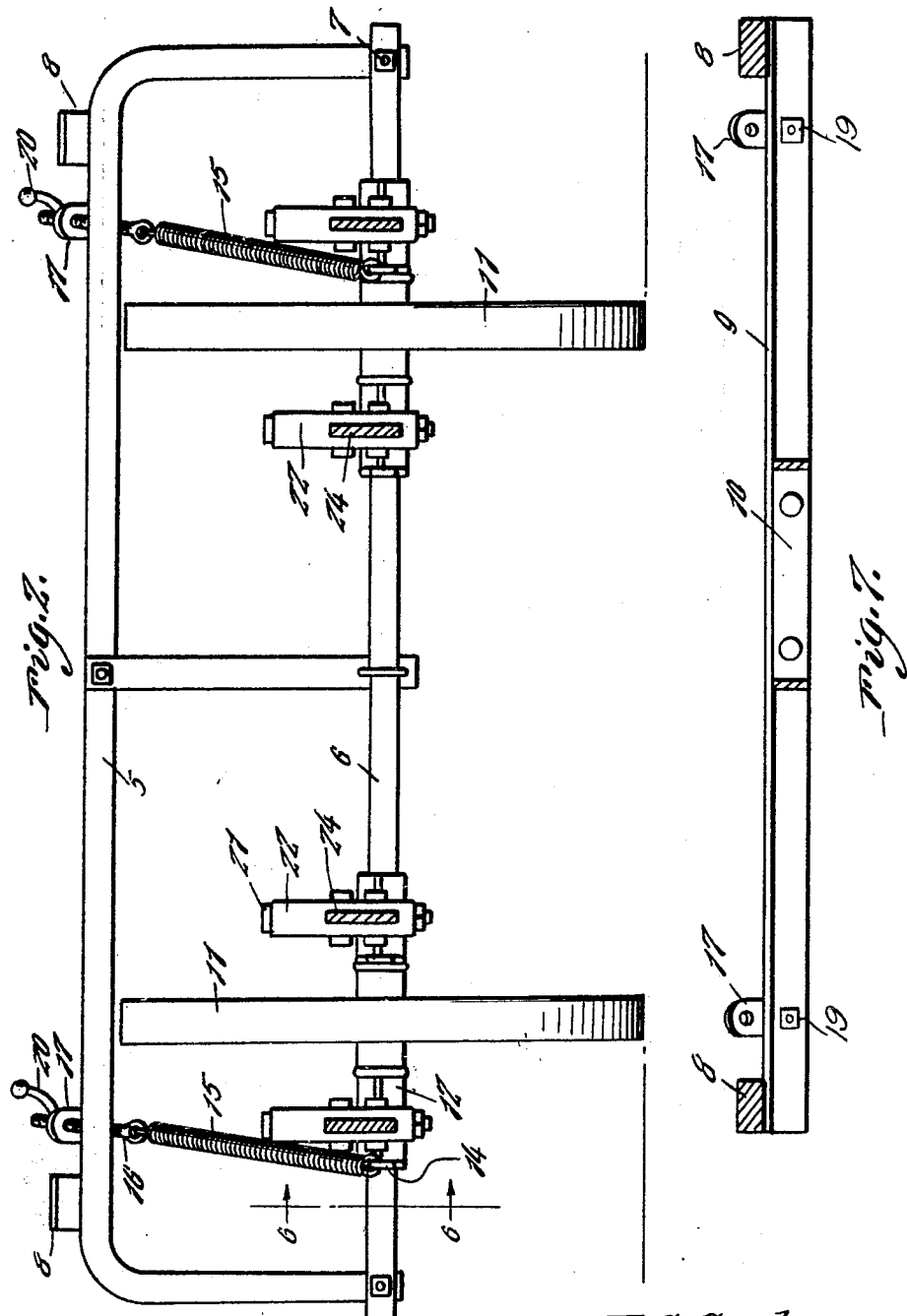

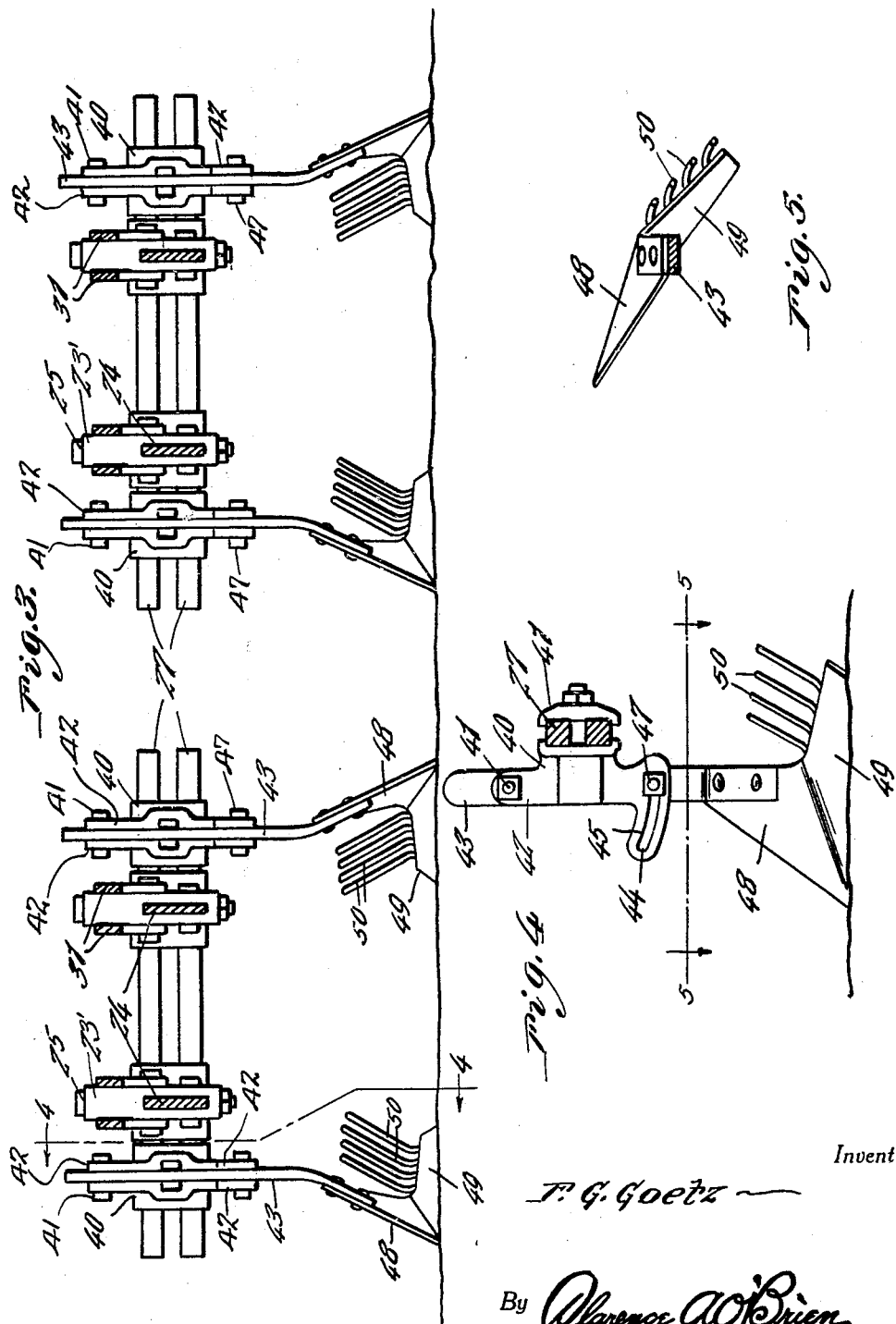

Patented Jan. 12, 1932

1,840,502

UNITED STATES PATENT OFFICE

FRED G. GOETZ, OF PLAINVIEW, MINNESOTA

ONION LIFTING APPARATUS

Application filed November 19, 1929. Serial No. 408,302.

The present invention relates to an agricultural wheeled implement designed particularly for the purpose of lifting onions from the rows, lifting four rows at one time, and throwing the onions into two windrows.

The prime object of the invention resides in the provision of a wheeled apparatus of this nature wherein the distance between the implements of the apparatus and the distance between the wheels thereof may be adjusted in accordance with the distance between the onion rows and other like conditions.

Another very important object of the invention resides in the provision of an apparatus of this nature which is simple in its construction, inexpensive to manufacture, strong and durable, easy to adjust, thoroughly efficient and reliable in use and operation, and otherwise well adapted to the purpose for which it is designed.

With the above and numerous other objects in view as will appear as the description proceeds, the invention resides in certain novel features of construction, and in the combination and arrangement of parts as will be hereinafter more fully described and claimed.

In the drawings:

Figure 1 is a vertical longitudinal section through the apparatus embodying the features of my invention, Figure 2 is a vertical transverse section taken substantially on the line 2—2 of Figure 1, Figure 3 is a similar section taken substantially on the line 3—3 of Figure 1, Figure 4 is a sectional view taken substantially on the line 4—4 of Figure 3, Figure 5 is a sectional view taken substantially on the line 5—5 of Figure 4, Figure 6 is a detail section taken substantially on the line 6—6 of Figure 2, and Figure 7 is a sectional view taken substantially on the line 7—7 of Figure 1.

Referring to the drawings in detail it will be seen that the numeral 5 denotes an arch frame across the ends of which is an axle 6 bolted or otherwise secured to said ends as at 7. Draft tongues 8 project forwardly from the arch frame adjacent the sides thereof and have an angle iron brace 9 fixed therebetween a distance forwardly of the frame 5 but adjacent thereto and a suitable brace 10 is disposed between the angle iron 9 and the top of the frame 5.

A pair of wheels 11 are journaled on the axle 6 between the sides of the frame and on each side of each wheel there is clamped to the axle in a rockable manner a casting 12 which is formed with a rearwardly directed crank arm 14 to which may be anchored a spring 15.

The springs 15 are preferably engaged with the two outermost arms 14 and the upper ends of the springs are engaged with threaded bolts 16 which extend through apertured ears 17 on straps 18 secured to the angle iron 9 by means of bolts 19 and nuts 20 are threadedly engaged with the bolts so that the tension of the springs may be controlled and adjusted.

Pins 21 are vertically disposed in the castings 12 and rockably receive on their ends apertured ears 22 of castings 23 which may rock from side to side and arms 24 are bolted or otherwise secured as at 25 to the castings 23 to extend rearwardly and on their rear ends have bolted thereto castings 23' similar to castings 23 formed with the apertured ears 21'.

These apertured ears 21' receive pins 25 of castings 26. The two castings 26 which are associated with the wheel are held in spaced relation by bars 27 clamped thereto by suitable means 28. Thus the arms 24, bars 27 and the axle are arranged in parallelogram formation which permits the sideward swinging of the castings 26 but maintains them in their respective pairs in the same spaced relation as may be required after a proper adjustment has been made.

Handle bars 30 are anchored to the arms 24 and inclined upwardly and rearwardly and are braced as at 31. these braces being secured to the castings 23' by one of the bolts 25'.

A pair of castings 40 are clamped to each pair of bars 27 by suitable means 41 and are located to the outside of the castings 26. These castings are formed with a pair of extensions 42 between the upper ends of which is pivoted as at 41 a shank 43 and at the lower ends of the extensions are arcuate members 44 with arcuate slots 45 therein to receive bolts 47 extending through an intermediate portion of the shank 43.

The lower end of each shank 43 inclines downwardly and outwardly and to it is secured an onion lifting blade 48 having a rearwardly and inwardly or a rearwardly and outwardly directed wing 49 with upwardly and rearwardly inclined tines or teeth 50 attached in any desired manner on the rearward side adjacent the upper edge thereof.

It will therefore be seen that the angle of the shank 43 may be adjusted in respect to the arms 24 by loosening the bolt 47 and making the desired adjustment. The counterbalancing spring 15 will enable the operator grasping the handle bar 30 to more readily lift the implement from the ground when it is necessary.

The operator guides the implements and swings them from side to side to take care of the irregularities found in the rows. The blades dig up the onions which gather against the wing 49 and are thrown inwardly in two windrows from the four rows of onions by means of the guide tines or teeth 50.

It is thought that the construction, operation, adjustability and other features of the invention will now be quite apparent to those skilled in this art without a more detailed description thereof.

The present embodiment of the invention has been disclosed in considerable detail merely for the purposes of exemplification since in actual practice it attains the features of advantage enumerated as desirable in the statement of the invention and the above description.

It will be apparent that changes in the details of construction, and in the combination and arrangement of parts may be resorted to without departing from the spirit or scope of the invention as hereinafter claimed or sacrificing any of its advantages.

Having thus described my invention, what I claim as new is:

1. In an apparatus of the class described, a wheeled frame, a plurality of oppositely formed blades having rearwardly directed wings extending therefrom and formed on their upper edges with rearwardly inclined guide tines, said wheeled frame comprising an axle, a pair of wheels rotatable and slidable on the axle, a pair of castings associated with each wheel one to each side thereof and rockable on the axle, arms projecting rearwardly from the castings, and being so mounted on said castings that the rear ends of the arms may be swung from side to side, other castings rockably mounted on the rear ends of the arms, bars clamped across and between said other castings, shanks rising from the blades, and means for engaging the shanks with the bars, said first-mentioned castings having rearwardly projecting crank arms, counterbalancing springs engaged with some of the crank arms, and the wheeled frame, and tensioning means associated with said springs, so that the springs are tensioned to have a tendency to swing the crank arms upwardly.

2. An apparatus of the type described comprising an arched frame carrying an axle on which are a pair of wheel structures placed within the ends of the frame and longitudinally slidable thereon, a rockable casting on the axle on each side of the wheels confining said wheels and carrying vertical pins, horizontal rearwardly extended arms on said vertical pins adapted to be vertically swung and counterbalanced by a spring secured at one end to the said castings and at its other end to a tension adjuster mounted on a forward extension carried by the frame, said castings horizontally swingable on the rear ends of the horizontal arms supporting depending forwardly and backwardly swingable blades and adjusting bolts and curvate slots for the same, and adjustable clamps on the rear portions of said other castings carrying a pair of vertically spaced parallel bars between and across said other castings, upwardly and rearwardly inclined handle bars secured at their lower ends to the forward portion of said bars, and braces for said handle bars connected between an intermediate point thereof and the forward portion of the said other castings.

In testimony whereof I affix my signature.

FRED G. GOETZ.